May 10, 1949. R. D. ACTON 2,469,622
TRACTOR-DRAWN IMPLEMENT TURN RESPONSIVE
LIFTING AND ADJUSTING MECHANISM
Filed Dec. 22, 1945 2 Sheets-Sheet 2

Inventor:
Russel D. Acton
By
Atty.

Patented May 10, 1949

2,469,622

UNITED STATES PATENT OFFICE 2,469,622

TRACTOR-DRAWN IMPLEMENT TURN RESPONSIVE LIFTING AND ADJUSTING MECHANISM

Russel D. Acton, Chicago, Ill.

Application December 22, 1945, Serial No. 636,793

22 Claims. (Cl. 55—73)

This invention relates to a tractor-drawn agricultural implement and more particularly to a tractor-drawn disk harrow of the multiple gang type. More specifically the invention relates to a lifting and adjusting mechanism for a tractor-drawn implement.

The main object of this invention is to provide an improved tractor adjusted agricultural implement.

More specifically, an object of this invention is to provide an improved lifting mechanism for a tractor-drawn disk harrow which is manually operable from an operator's station on the tractor.

Another object is to provide an automatic lifting and adjusting mechanism for a tractor-drawn disk harrow which will automatically lift and adjust the harrow gangs upon turning of the tractor with respect to the harrow.

Another important object is to provide an improved lifting and adjusting mechanism for a tractor-drawn implement which can be operated from the operator's station, so that the harrow can be readily lifted into a transport position.

Another object is to provide an improved tractor-drawn disk harrow construction and a lifting and adjusting mechanism therefore, said harrow construction including a pair of frames pivotally connected along a longitudinal axis and an automatic lifting device which will be actuated upon turning of the tractor with respect to the harrow, whereupon one frame will automatically be raised with respect to the other and which will therefore prevent the burrowing in of the harrow disks nearest the inside of the turn when turning the tractor and the harrow.

Another object is to provide an automatic adjusting device for a tractor-drawn disk harrow which can readily be disconnected within reach of an operator's station, therefore permitting manual control by the operator.

Another object of the invention is to provide an improved fluid lifting and adjusting device for a tractor-drawn agricultural implement which is actuated and controlled by the power lift of the tractor.

A still further object of the invention is to provide an automatic fluid pressure device which will automatically adjust the height of a tractor-drawn implement, such as a harrow, upon turning of the tractor.

Other objects and advantages will become apparent to those skilled in the art from the detailed description of the preferred embodiment of the invention to follow:

The invention accordingly resides in the combination and details of construction hereinafter described, claimed, and illustrated in the accompanying drawings, wherein:

Fig. 3 is a view of a spring pressure mechanism taken along the lines 3—3 of Fig. 2; and Fig. 4 is a detail view of a portion of the tractor-drawn implement and the draft mechanism connected thereto taken along the lines 4—4 of Fig. 2.

Figure 1:
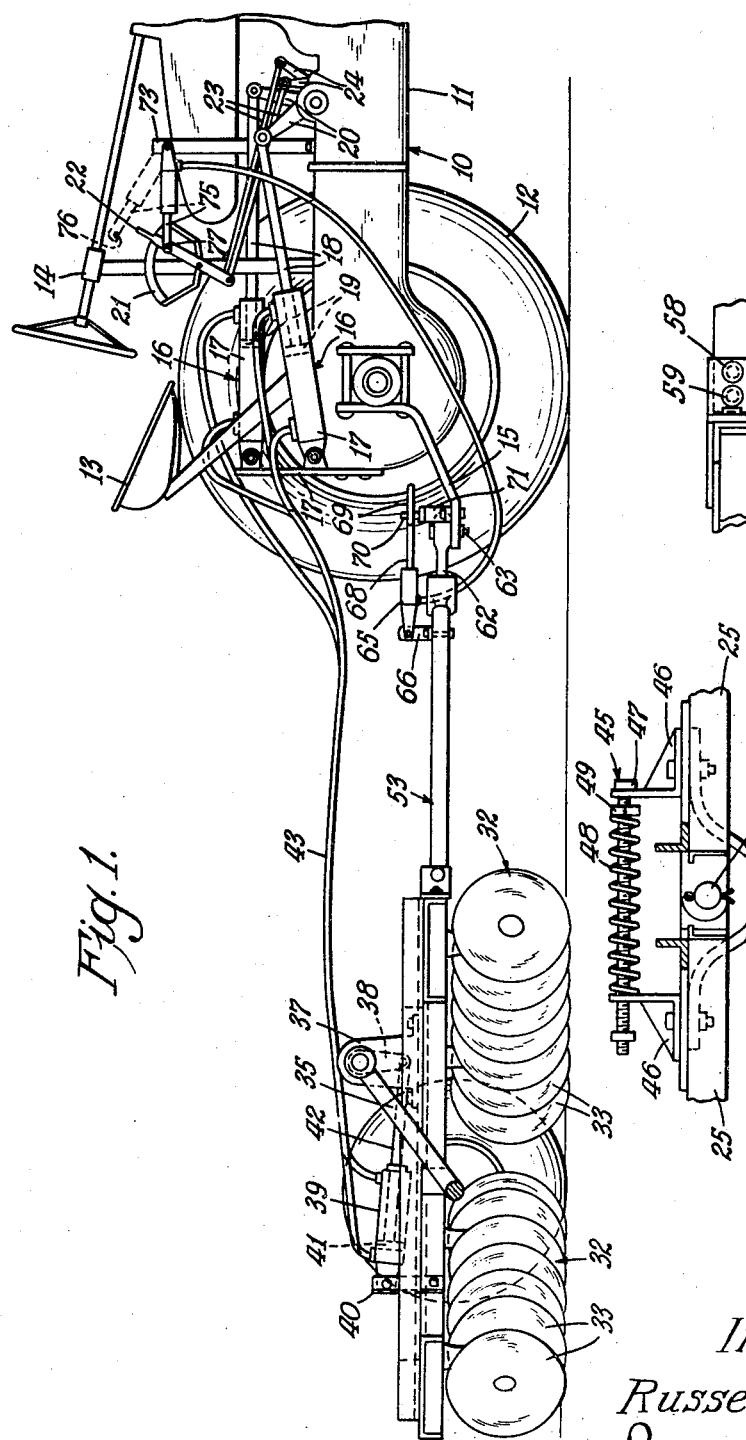
Fig. 1 is a side elevational view of a tractor and a tractor-drawn implement of the disk harrow type.
Figure 2:
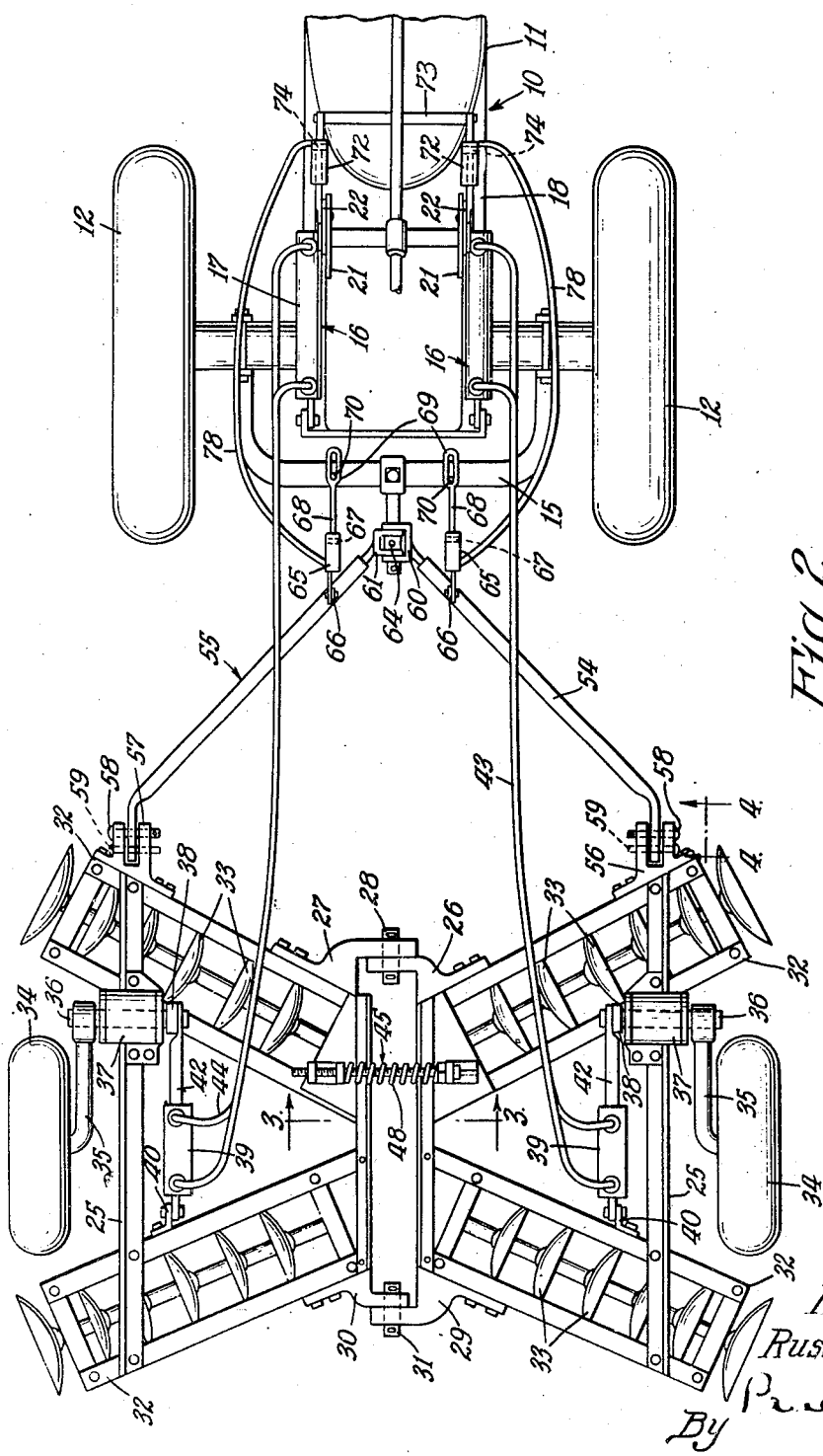
Fig. 2 is a plan view of the same.

As shown in Figures 1 and 2, a tractor 10 has a longitudinal body portion 11 which is supported at the rear thereof on ground wheels 12. An operator's station 13 is provided on the longitudinal body 11 and is in close proximity to a steering column and mechanism 14. Connected to the aft portion of the longitudinal body 11 is a draw-bar structure 15.

A pair of power-actuated units 16 are longitudinally mounted on the tractor 10. Each power-actuated unit 16 includes a hydraulic cylinder 17 and a piston rod 18 carrying a piston 19 for reciprocation in the cylinder. Each hydraulic cylinder 17 is supported at one end by a bracket 17' connected to the longitudinal body 11. Each piston rod 18 is connected at its forward portion to an oscillating arm 20 which is operatively connected to a power-lift mechanism, not shown, which is enclosed in the longitudinal body 11. The type of power-lift mechanism that may be utilized is fully disclosed in the application of Carl W. Mott, Serial No. 527,625, filed March 22, 1944, and entitled "Power adjusting mechanism."

A pair of detent mechanisms 21 are mounted on the steering column 14 within reach of the operator's station 13. Each detent mechanism 21 includes a lever arm 22 which is connected to push-pull rods 23. These push-pull rods 23 are in turn connected to a pair of rocker arms 24 which actuate the power-lift mechanism disclosed in the application mentioned above.

Positioned at the rear of the tractor 10 is an agricultural implement of the disk harrow type which includes a pair of frames 25. Hinge portions 26 and 27 are connected to the forward portion of the frames 25. A hinge pin 28 extends through the hinge portions 26 and 27. At the rear of the frames 25 there is provided a similar arrangement which includes rear hinge portions 29 and 30 and a hinge pin 31. Each frame 25 consists of two diverging harrow gangs 32 having a plurality of disk harrows 33 mounted thereon. Positioned between the diverging harrow gangs 32, and spaced outwardly of the frames 25, are ground wheels 34. Each ground wheel 34 is journaled on a crank axle 35, which in turn is fixed to a shaft 36 that is journaled in a support 37 connected to each of the frames 25. A depending arm 38 is rigidly connected to the shaft 36. A hydraulic cylinder 29 is connected to each frame 25 by a bracket 40. Each hydraulic cylinder includes a piston 41, mounted for reciprocation within the hydraulic cylinder 39, and a piston rod 42. A pair of conduits 43 and 44 are connected to each of the power-actuated units 16 and form a pair of closed hydraulic systems. The closed hydraulic systems are of the conventional type and provide for two-way action of the cylinders 39 upon movement of the power-actuated units 16.

As best shown in Figures 2 and 3, a pressure mechanism 45 is transversely mounted in the frames 25. The pressure mechanism 45 consists of brackets 46 which are connected to the frames 25 and a threaded pin 47 which carries a compression spring 48. An adjusting nut 49 is threaded on the threaded pin 47 between the compression spring 48 and one of the brackets 46 and permits adjustment of the compression spring. As shown in Figure 3, a pair of depending arms 50 and 51 are connected to the frames 25. A locking pin 52 restricts movement of the depending arms 50 and 51 with respect to one another. The locking pin 52 is inserted when the operator wishes to lock the frames 25 against pivotal movement about their longitudinal axis. This is necessary when it is desired to place the implement in a transport position.

The frames 25 are connected to the draw-bar structure 15 of the tractor 10 by a draw-bar structure 53. The draw-bar structure 53 includes a pair of diverging members 54 and 55. Connected to each frame at the forward portion thereof are draw-bar brackets 56 and 57 which pivotally connect said diverging members 54 and 55 by means of pivot pins 58. A locking pin 59, as shown in Figure 4, and as indicated in phantom lines in Figure 2, is adapted to be connected to the brackets 56 and 57 to lock the diverging members 54 and 55 against pivotal movement with respect to the frames 25. The necessity for this locking pin will presently be described. The forward portions of each of the diverging members 54 and 55 has a yoke 60 and 61 respectively connected thereto. A shaft 62 is connected to the draw-bar 15 for pivotal movement about a vertical axis 63. The shaft 62 extends through the yokes 60 and 61 and allows pivotal movement of the diverging members 54 and 55 about a longitudinal axis. A collar 64 secures said yokes 60 and 61 on the shaft 62. The shaft 62 and the yokes 60 and 61 are substantially in alinement with the hinge pins 28 and 31 and thus permit pivotal movement of the frames 25 with respect to the draw-bar 15 and the tractor 10.

Connected to the diverging members 54 and 55 are left and right hand cylinders 65. Each of these cylinders 65 is secured to the diverging members 54 and 55 by brackets 66. A piston 67 connected to a piston rod 68 is mounted for reciprocation within each cylinder 65. Each piston rod 68 consists of a slotted portion 69 in which rides a pin 70. Each pin 70 is connected to the draw-bar structure 15 by a bracket 71.

A pair of left and right hand cylinders 72 are connected at each side of the longitudinal body 11 by a supporting bracket 73. Each cylinder 72 has a piston 74 connected to a piston rod 75. Each piston rod 75, as best shown in Figure 1, includes a hook portion 76 which normally engages a pin 77 connected to each lever 22. Fluid conduits 78 are connected to the cylinders 65 and are in communication with the cylinders 72.

In using a tractor-drawn agricultural implement of the disk harrow type certain problems may be encountered. When making turns with a disk harrow, there is a tendency of the harrow disks nearest the inside of the turn to dig and burrow deeper into the ground than the other disks and thereby cause an uneven operation and otherwise increase the difficulty in turning. In operating a disk harrow embodying the invention disclosed, the tractor operator is free to make turns without the disadvantage previously stated, since the harrow automatically adjusts itself upon turning of the tractor with respect to the implement. As the tractor turns, the piston 67 on the inside of the turn is moved rearwardly and fluid within the cylinder 65 is forced through the conduit 78 to one of the cylinders 72 causing one of the pistons 74 to move rearwardly, thereby actuating the control lever 22 of the detent mechanism 21. The actuation of the lever 22 causes movement of one of the rocker arms 24 to actuate the power-lift mechanism, not shown, in the longitudinal body of a tractor. The actuation of the power-lift mechanism causes rearward movement of the oscillating arm 20, thereby causing rearward movement of the piston 19 in the cylinder 16. Fluid is forced through the conduit 43 to the cylinder 39 causing the piston 41 to travel forwardly, thereby actuating the arm 38 to move the crank axle 35 forwardly, causing vertical raising of one frame member 25 with respect to the other. Thus it will be seen that one of the frames 25 and the harrow gangs 32 will be raised upon turning of the tractor with respect to the implement. It is to be understood that the operation has been described with respect to the turning of the tractor in one direction, causing actuation and lifting of the cylinders and implements on the side in which direction of turn is made. The same action would take place for the other side upon turning in the opposite direction. As one of the cylinders 65 is actuated upon turning, the other cylinder remains stationary and the piston rod 68 slides around the pin 70 thereby having no actuating force. When the tractor and the harrow are again in a straight line, the turn having been completed, the fluid pressure in the cylinders will be relieved and the mechanism will return to a normal position.

If the operator on the tractor decides to manually operate the implement, he simply swings the cylinders 72 about their horizontal axis (as shown in Figure 1), thereby disengaging the piston rod 75 and the hook portion 76 from the lever 22. The operator now has complete manual control of the implement and can raise either side of the implement, at will, upon turning or upon attempting to avoid an obstruction in the way of the harrow gangs. As described in the aforementioned application, the lever 22 on the detent mechanism 21 provides a finger-tip control, which permits the pistons 19 to be moved to any point within the cylinder 17. This permits the implement to be lowered and raised to any point within the range of the cylinders 39. Should the operator want to transport the implement, he simply actuates the lever 22, thereby actuating the cylinders 39 to their utmost capacity which in turn raises the frames 25 completely free of the ground to a transport position. In order to lock the frames 25 against pivotal movement about their longitudinal axis, a pin 52 (shown in Figure 3) connects the members 50 and 51. In order to rigidly secure the diverging members 54 and 55 against pivotal movement around the pins 58, a locking pin 59 is connected through the members 56 and 57, as best shown in Figures 3 and 4. It can be seen by this arrangement that a single rigid structure is now provided. If the operator desires, he can also utilize this arrangement in a ground working position, since one side of the now rigid construction can still be raised with respect to the other.

As shown, the pivot point of the crank axle 35 is closer to the front harrow gangs 32 which permits these gangs to be lifted slightly higher than the rear gangs 32. Since it is the forward harrow gangs that burrow deepest into the ground upon turning, this is a desirable arrangement. The pressure mechanism 45 normally tends to hold the harrow gangs in engagement with the ground when the frames 25 are free to pivot about their longitudinal axis. The compression of the spring can be adjusted by manipulating the adjusting nut 49 on the threaded pin 47.

It is to be understood that a preferred embodiment of the invention has been shown and described and that various modifications may be made without departing from the spirit of the invention or the scope of the appended claims.

What is claimed is:

1. In combination with a tractor having a pair of power-actuated lifting arms thereon and control levers for operating said arms, an implement connected to said tractor, said implement having a pair of frames for carrying earth-working implements, said frames being pivotally connected to each other on a longitudinal axis, adjustable supporting means for the outer ends of said frames, actuating means connected to said adjustable supporting means and to said power actuated lifting arms, and means constructed and arranged to move said power actuated lifting arms for actuating said actuating means upon pivoting movement of said tractor with respect to said implement, whereby said frames will be lifted in the direction of operation of said tractor.

2. In combination with a tractor having a pair of power actuated lifting arms thereon and control levers for operating said arms, an implement connected to said tractor, said implement having a pair of frames for carrying earth-working implements, said frames being pivotally connected to each other on a longitudinal axis, adjustable supporting means for the outer ends of said frames, fluid pressure means connected to said supporting means and said power actuated lifting arms, and means constructed and arranged to move said lifting arms for actuating said fluid pressure means upon pivoting movement of said tractor with respect to said implement whereby said frames will be lifted in the direction of operation of said tractor.

3. In combination, a tractor having a pair of power-actuated means, a control means adapted to move said power actuated means to a plurality of positions, an implement pivotally connected to said tractor, said implement including a frame structure and ground working tools, a pair of ground wheels associated with said frame structure and adjustably connected to independently move one end of said frame structure with respect to the other, a power transmitting means connected to said frame structure and to each of said ground wheels, means connected to said power transmitting means and said power actuated means for actuating said power transmitting means, and means connected between the tractor and the implement, said means including means connected to said control means for controlling said power actuating means to lift one end of said frame structure upon pivotal movement of said tractor with respect to said implement.

4. In combination, a tractor having a pair of power-actuated means, a control means adapted to move said power-actuated means to a plurality of positions, an implement pivotally connected to said tractor, said implement including a plurality of frames having ground-working tools connected thereto, means pivotally connecting said frames about a longitudinal axis, a ground wheel associated with each frame and adjustably connected to move each frame vertically with respect to the other, a cylinder and piston means connected to each frame and to each ground wheel, means connected to said cylinder and piston and to said power-actuated means for actuating said cylinder and piston, and means connected between the tractor and the implement, said means including means connected to said control means for controlling said power-actuated means to move said cylinder and piston means thereby raising one of said frames vertically upon pivotal movement of said tractor with respect to said implement.

5. In combination, a tractor having a power-actuated means, a control means adapted to move said power-actuated means to a plurality of positions, an implement pivotally connected to said tractor, said implement including a frame having ground-working tools connected thereto, a ground wheel adjustably associated with said frame and adapted to lift one end of said frame with respect to the ground, a cylinder and piston means associated with said frame and said ground wheel, means operatively connecting said cylinder and piston to said actuating means, and means connected between the tractor and the implement, said means including means connected to said control means for controlling said power-actuating means to move said cylinder and piston means thereby lifting one end of said frame upon pivotal movement of said tractor with respect to said implement.

6. In combination, a tractor having a power-actuated means, a control means adapted to move said power-actuated means to a plurality of positions, an implement pivotally connected to said tractor, said implement including a frame having ground working tools connected thereto, a ground-engaging means adjustably associated with said frame and adapted to lift one end of said frame with respect to the ground, a power-transmitting means associated with said frame and said ground-engaging means, means operatively connecting said power-transmitting means to said actuating means, and means connected between said frame and the tractor, said means including means connected to said control means for controlling said power-actuating means to lift one end of said frame upon pivotal movement of said tractor with respect to said implement.

7. In combination, a tractor having a pair of power-actuated means, a control means adapted to move said power-actuated means to a plurality of positions, an implement pivotally connected to said tractor, said implement including a plurality of frames having ground working tools connected thereto, means pivotally connecting said frames about a longitudinal axis, a ground wheel associated with each frame and adjustably connected to move each frame vertically with respect to the other, a cylinder and piston connected to each frame and to each ground wheel, means connected to said cylinder and piston and to said power-actuated means for actuating said cylinder and piston, means associated with said implement and the tractor, said means including means connected to said control means for controlling said power-actuated means to move one of said frames vertically upon pivotal movement of said tractor with respect to said implement, and means for locking said frames against pivotal movement.

8. In combination, a tractor having a pair of power-actuated means, a control means adapted to move said power-actuated means to a plurality of positions, an implement pivotally connected to said tractor, said implement including a pair of frames pivotally connected about a longitudinal axis, ground working tools connected to said frames, a spring pressure means connected to said frames for normally urging said ground working tools into engagement with the ground, a ground wheel associated with each frame and adjustably connected to move each frame vertically with respect to the other, a cylinder and piston associated with each frame and each ground wheel, means connecting said cylinder and piston with said power actuated means, and means connected between said implement and the tractor, said means including means connected to said control means for controlling said power-actuated means to move one of said frames vertically upon pivotal movement of said tractor with respect to said implement.

9. In combination, a tractor having a pair of power-actuated means, a control means adapted to move said power-actuated means to a plurality of positions, an implement pivotally connected to said tractor, said implement including a pair of frames pivotally connected about a longitudinal axis, ground working tools connected to said frames, a resilient means connected to said frames for normally urging said ground working tools into engagement with the ground, a ground wheel associated with each frame and adjustably connected to move each frame vertically with respect to the other, a cylinder and piston means associated with each frame and each ground wheel, means connecting said cylinder and piston with said power-actuated means, and means connected to said implement, said means including means connected to said control means for controlling said power-actuated means to move said cylinder and piston means thereby moving one of said frames vertically upon pivotal movement of said tractor with respect to said implement.

10. In combination, a tractor having a power-actuated means, a control means adapted to move said power-actuated means to a plurality of positions, an implement pivotally connected to said tractor, said implement including a pair of harrow gangs positioned in diverging relationship to one another, a frame rigidly connecting said harrow gangs, a ground-engaging means adjustably associated with said frame for moving said harrow gangs vertically with respect to the ground, a power transmitting means connected to said frame and to said ground engaging means, means connecting said power transmitting means with said power-actuated means, and means connected between the implement and the tractor, said means including means connected to said control means for controlling said power-actuated means to move said harrow gangs vertically with respect to the ground upon pivotal movement of said tractor.

11. In combination, a tractor having a power-actuated means, a control means adapted to move said power-actuated means to a plurality of positions, an implement pivotally connected to said tractor, said implement including a pair of harrow gangs positioned in diverging relationship to one another, a frame rigidly connecting said harrow gangs, a ground wheel positioned between said harrow gangs and adjustably associated with said frame for moving said harrow gangs vertically with respect to the ground, a power transmitting means connected to said frame and to said ground wheel, means connecting said power transmitting means with said power-actuated means, and means associated with said implement and said tractor, said means including means connected to said control means for controlling said power-actuated means to move said harrow gangs vertically with respect to the ground upon pivotal movement of said tractor.

12. In combination, a tractor having a pair of power-actuated means, a pair of control means adapted to move each power-actuated means to a plurality of positions, an implement pivotally connected to said tractor, said implement including a pair of frames, means for pivotally connecting said frames about a longitudinal axis, two harrow gangs connected to each frame in outwardly diverging relationship, a ground engaging means adjustably connected to each frame and adapted to lift said harrow gangs, a power transmitting means connected to each of said frames and said ground engaging means, means connecting each power transmitting means with each power-actuated means, and means associated with said tractor and the implement, said means including means connected to said control means for controlling said power-actuated means to lift said harrow gangs upon pivotal movement of said tractor.

13. In combination, a tractor having a pair of power-actuated means, a pair of control means adapted to move each power-actuated means to a plurality of positions, an implement pivotally connected to said tractor, said implement including a pair of frames, means for pivotally connecting said frames about a longitudinal axis, two harrow gangs connected to each frame in outwardly diverging relationship, a ground wheel positioned between said harrow gangs and adjustably connected to each frame, said ground wheel being adapted to lift said harrow gangs, a power transmitting means connected to each of said frames and to said ground wheel, means connecting each power transmitting means with each power-actuated means, and means connected between said tractor and said implement, said means including means connected to said control means for controlling said power-actuated means to lift said harrow gangs upon pivotal movement of said tractor.

14. In combination, a tractor having a pair of power-actuated means, a pair of control means adapted to move each power-actuated means to a plurality of positions, an implement pivotally connected to said tractor, said implement including a pair of frames, means for pivotally connecting said frames about a longitudinal axis, two harrow gangs connected to each frame in outwardly diverging relationship, resilient means connected to each frame for normally holding said harrow gangs in engagement with the ground, a ground wheel positioned between said harrow gangs and adjustably connected to each frame, said ground wheel being adapted to lift said harrow gangs, a power transmitting means connected to each of said frames and said ground wheel means, means connecting each power transmitting means with each power-actuated means, and a hydraulic actuated means connected to each frame, said hydraulic actuated means including means connected to each control means for controlling said power-actuated means to lift said harrow gangs upon pivotal movement of said tractor.

15. In combination, a tractor having a pair of power-actuated means, a pair of control means adapted to move each power-actuated means to a plurality of positions, an implement pivotally connected to said tractor, said implement including a pair of frames, means for pivotally connecting said frames about a longitudinal axis, two harrow gangs connected to each frame in outwardly diverging relationship, resilient means connected to each frame for normally holding said harrow gangs in engagement with the ground, a ground wheel positioned between said harrow gangs and adjustably connected to each frame, said ground wheel being adapted to lift said harrow gangs, a fluid pressure actuated means connected to each of said frames and said ground engaging means, means connecting each fluid pressure actuated means with each power-actuated means, and a fluid pressure actuated means connected to each frame, said fluid pressure actuated means including means connected to each control means for controlling said power-actuated means to lift said harrow gangs upon pivotal movement of said tractor.

16. In combination, a tractor having a pair of power-actuated lifting arms, manual control levers for actuating said arms, an implement connected to said tractor, said implement having a pair of frames for carrying earth working implements, means pivotally connecting said frames about a longitudinal axis, a ground engaging means adjustably supporting the outer end of each frame, a power transmitting means connected to each frame and to each ground engaging means, means connected to each of said power-actuated lifting arms for actuating said power transmitting means to move said ground engaging means, whereby said frames will be lifted to a transport position, and means for locking said frames against pivotal movement while in their transport position.

17. In combination, a tractor having a pair of power-actuated means, a manual control means for regulating movement of said power-actuated means, an implement pivotally connected to said tractor, said implement including a frame structure and ground working tools, a ground wheel at each side of the frame structure, each ground wheel being adjustably connected to independently raise one end of said frame structure with respect to the other, a power transmitting means connected to said frame structure and to each of said ground wheels, and means for transmitting power from each of said power-actuated means to each of said power transmitting means to independently raise one end of each frame structure upon manual movement of said manual control means.

18. In combination, a tractor having a pair of power-actuated means, a manual control means for regulating movement of said power-actuated means, an implement pivotally connected to said tractor, said implement including a frame structure and ground working tools, a pair of ground wheels associated with said frame structure and adjustably connected to raise said frame structure, a power transmitting means connected to said frame structure and to each of said ground wheels, and means for transmitting power from each of said power-actuated means to each of said power transmitting means to independently adjust one of said ground wheels with respect to the other upon manual movement of said manual control means.

19. In combination, a tractor having a pair of power-actuated means, a manual control means adapted to regulate the movement of each power-actuated means, an implement pivotally connected to said tractor, said implement including a pair of frames having ground working tools connected thereto, means for pivotally connecting said frames about a longitudinal axis, a ground wheel adjustably connected to each frame to move each of said frames vertically with respect to the other, a power transmitting means connected to each of said frames and said ground wheels, and means for transmitting power from each of said actuated means to each of said power transmitting means to independently raise one of said frames upon manual movement of one of said control means.

20. In combination, a tractor having a pair of power-actuated lifting arms, a control means for each power-actuated lifting arm, an agricultural implement comprising a pair of frames, pivotal means connected to said frames for permitting pivotal movement of one frame with respect to the other about a longitudinal axis, ground working tools connected to said frames, a ground engaging means associated with each frame and adjustably connected thereto, said ground engaging means being adapted to vertically move said frames, a power transmitting means connected to each frame and each ground engaging means, means for transmitting power from said power-actuated lifting arms to said power transmitting means, a draw-bar connected to said frames, said draw-bar being pivotally connected to said tractor about a longitudinal axis substantially in line with said pivotal means, a pair of fluid pressure means connected between the tractor and the implement, and a second pair of fluid pressure means connected to the tractor and each control means, a conduit means connecting each of said first and second pair of fluid pressure means, whereby said control means will be moved to actuate said power transmitting means to vertically move one of said frames upon turning of said tractor.

21. In combination, a tractor having a power-actuated means, a control means for regulating movement of said power-actuated means, an implement pivotally connected to said tractor, said implement including a laterally extending frame structure and ground working tools mounted thereon, a pair of laterally spaced ground wheels associated with said frame structure, one of said wheels being adjustably connected to raise and lower one end of said frame structure, a power transmitting means connected to said frame structure and to said adjustable ground wheel, and flexible means for transmitting power from said power-actuated means on the tractor to said power transmitting means to independently adjust said adjustably connected ground wheel with respect to the other upon movement of said control means.

22. In combination, a tractor having a power actuated means thereon, control means for regulating movement of said power actuated means, a disk harrow pivotally connected to the tractor, said harrow including a forward gang extending at an angle forwardly and outwardly at one side of the tractor and a rearward gang extending at an angle rearwardly and outwardly in trailing position behind the forward gang, depth control means for the adjacent ends of said gangs and wheel means for adjustably supporting the diverging ends of said gangs, flexible power transmitting means connected to the power actuated means on the tractor for adjusting the said last named wheel means independently of the depth control means for the adjacent ends of the gangs, whereby the diverging ends of the gangs may be lifted to provide for a short turn of the tractor and implement in the direction of said diverging ends.

RUSSEL D. ACTON.

REFERENCES CITED

The following references are of record in the file of this patent:

UNITED STATES PATENTS

| Number | Name | Date |
| --- | --- | --- |
| 1,830,761 | Johnson et al. | Nov. 10, 1931 |
| 2,239,029 | Barrett | Apr. 22, 1941 |
| 2,268,923 | Bryant | Jan. 6, 1942 |
| 2,349,257 | Evans et al. | May 23, 1944 |
| 2,385,637 | Mitchell et al. | Sept. 25, 1945 |
| 2,392,006 | Silver | Jan. 1, 1946 |

FOREIGN PATENTS

| Number | Country | Date |
| --- | --- | --- |
| 49,048 | Sweden | Apr. 11, 1919 |